(12) United States Patent
Horii

(10) Patent No.: US 6,356,267 B1
(45) Date of Patent: Mar. 12, 2002

(54) METHOD OF CREATING TWO DIMENSIONAL SHAPES DRAWING SYSTEM

(75) Inventor: Youichi Horii, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/455,405

(22) Filed: Dec. 6, 1999

(30) Foreign Application Priority Data

Dec. 8, 1998 (JP) ............................................. 10-348184

(51) Int. Cl.⁷ .............................................. G06T 17/00
(52) U.S. Cl. ....................................... 345/441; 345/442
(58) Field of Search ................................ 345/441, 440, 345/440.1, 469.1, 473, 474, 630, 631, 632, 633, 634, 423, 420, 442

(56) References Cited

U.S. PATENT DOCUMENTS

| | | | |
|---|---|---|---|
| 5,325,475 A | * 6/1994 | Poggio et al. | 345/433 |
| 5,574,836 A | * 11/1996 | Broemmelsiek | 345/427 |
| 5,694,331 A | * 12/1997 | Yamamoto et al. | 364/514 |
| 5,703,604 A | * 12/1997 | McCutchen | 345/8 |
| 5,748,865 A | * 5/1998 | Yamamoto et al. | 345/423 |
| 5,877,768 A | * 3/1999 | Jain | 345/421 |
| 5,999,188 A | * 12/1999 | Kumar et al. | 345/423 |
| 6,016,153 A | * 1/2000 | Gueziec et al. | 345/441 |
| 6,256,039 B1 | * 7/2001 | Krishnamurthy | 345/420 |

* cited by examiner

*Primary Examiner*—Cliff N. Vo
(74) *Attorney, Agent, or Firm*—Antonelli, Terry, Stout & Kraus, LLP

(57) ABSTRACT

Animation creating method for panting regions inside a polygon and/or creating polylines constituting a polygon without the shared use of vertices between shape elements. The method comprises the steps of: connecting a plurality of vertices by polylines to create a polygon A on a computer so as to store shape information about the polygon A into a data table; creating a polyline sequence B which either starts from or ends at one of the vertices of the polygon A; if the starting point of the polyline A coincides with a first vertex of the polygon A and if the end point of the polyline sequence B coincides with a second vertex of the polygon A, then dividing the polygon A by the polyline sequence B into polygons A1 and A2 while deleting the shape information about the polygon A from the data table and storing shape information about the polygons A1 and A2 into the data table; and displaying the resulting polygons on a display on the basis of the stored shape information.

14 Claims, 7 Drawing Sheets

100 EDITING HIERARCHICAL SHAPES AND DRAWING SYSTEM

FIG. 1
100 EDITING HIERARCHICAL SHAPES AND DRAWING SYSTEM
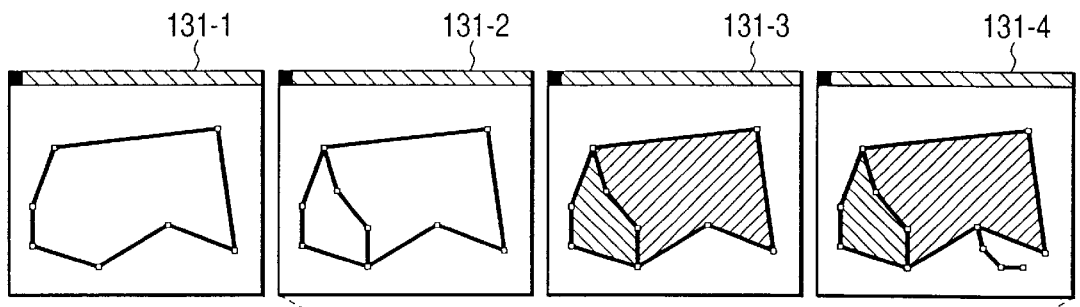
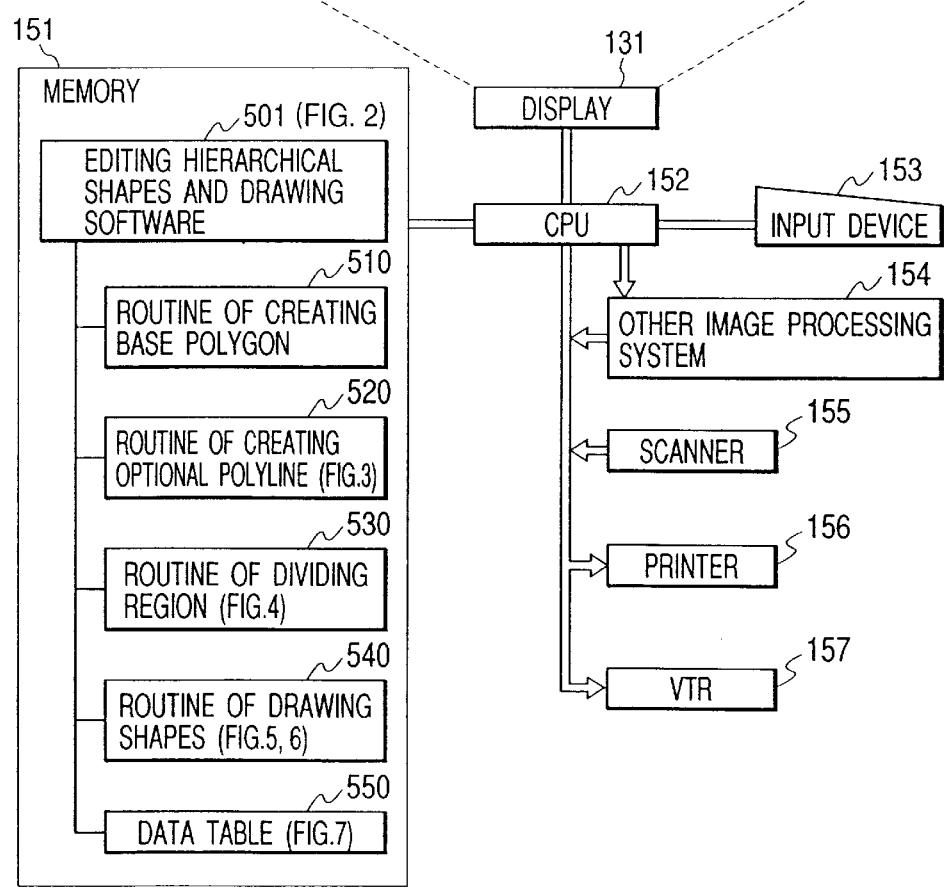

<u>530</u> ROUTINE OF DIVIDING REGION (a) BASE SHAPE (b) DIVIDING POLYLINE (c) DIVIDING POLYLINE (d) BRANCHING POLYLINE

FIG. 5
540 ROUTINE OF DRAWING
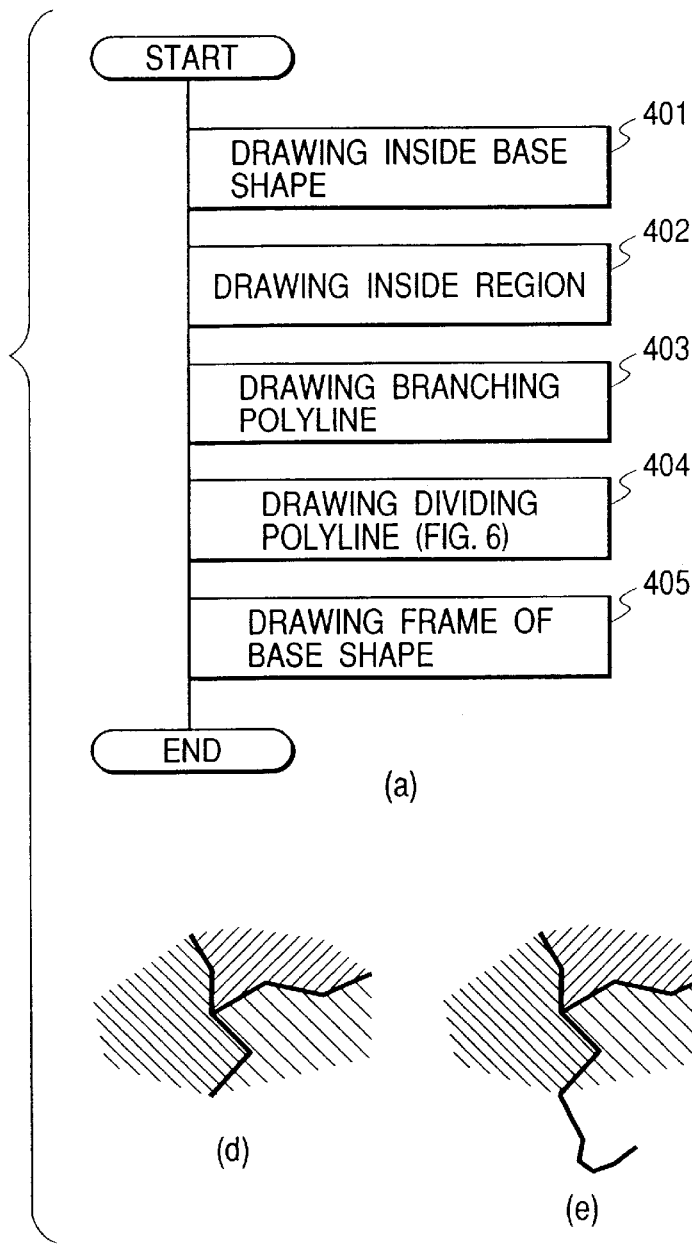
(a)
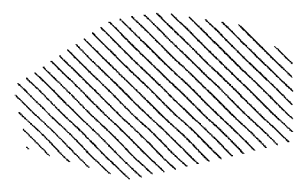
(b)
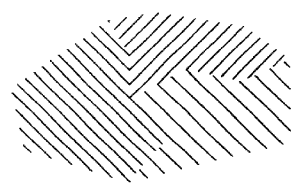
(c)
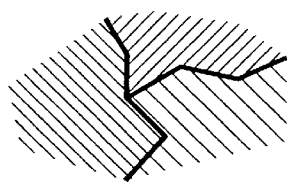
(d)
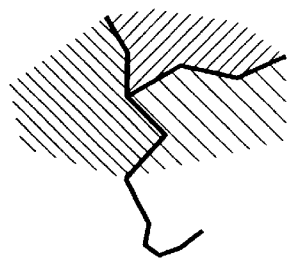
(e)
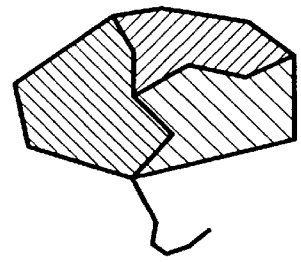
(f)

ROUTINE OF DRAWING DIVIDING POLYLINE

550 DATA TABLE

| VERTICES | COORDINATES | {x0, y0}, {x1, y1}, {···}, ··· | 601 |
|---|---|---|---|
| | COLOR | {r0, g0, b0}, {r1, g1, b1}, {···}, ··· | 602 |
| | TRANSPARENCY | a0, a1, ··· | 603 |
| | WIDTH | w0, w1, ··· | 604 |
| BASE SHAPE | | P0, P1, ··· PN | 605 |
| OPTIONAL POLYLINE | DIVIDING | {B0,0, B0,1, ··· B0,N}, {···}, ··· | 606 |
| | BRANCHING | {C0,0, C0,1, ··· C0,N}, {···}, ··· | 607 |
| REGION | | {R0,0, R0,1, ··· R0,N}, {···}, ··· | 608 |

FIG. 8
KNOWN METHOD
(a)
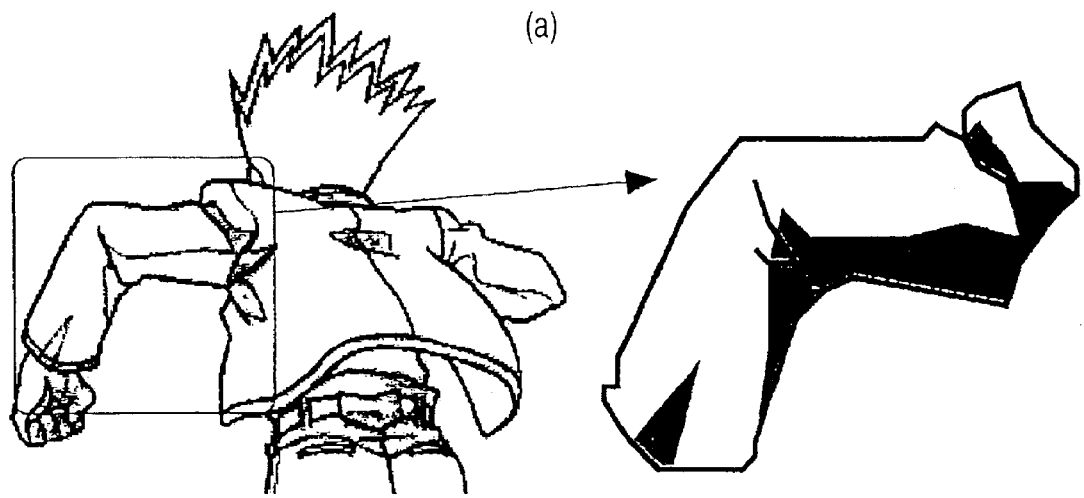
(b)
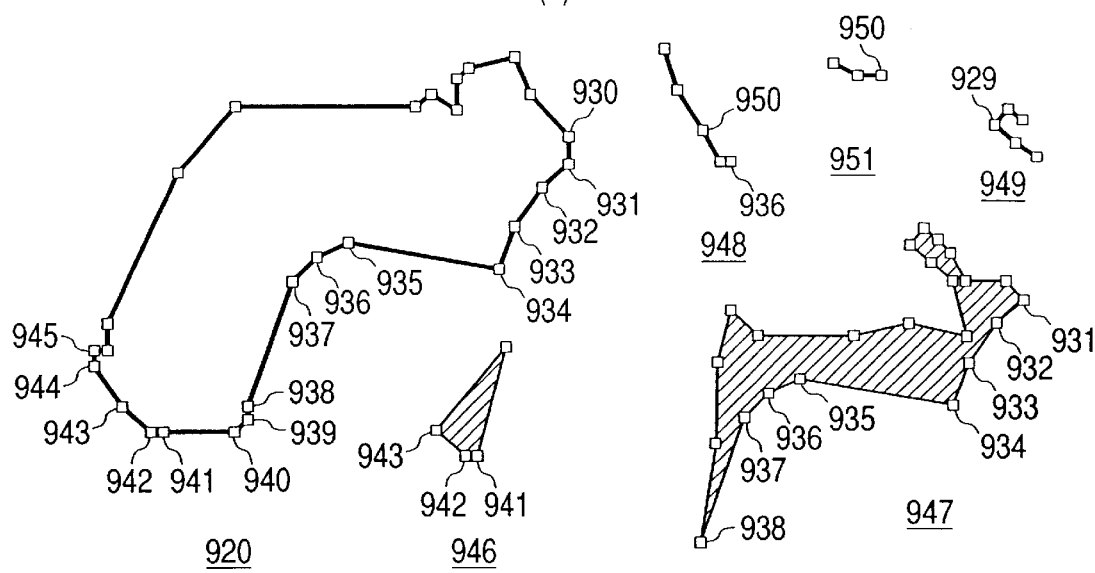
(c)
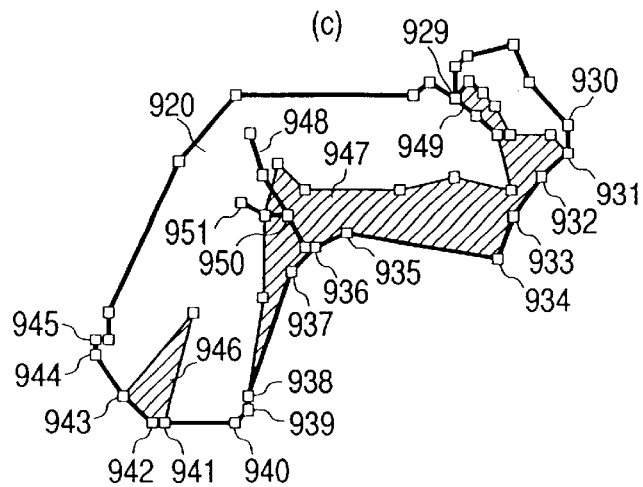

METHOD OF CREATING TWO DIMENSIONAL SHAPES DRAWING SYSTEM

BACKGROUND OF THE INVENTION

The present invention relates to a method of creating animation and a computer readable program. More particularly, the invention relates to a method for creating images by use of computer-based image processing software dealing with two-dimensional shapes, as well as to a method for creating two-dimensional animation.

A polygon such as the one in FIG. 8A is created by conventional drawing software as follows: vertices are established one after another by use of a mouse to form a polygon. The color and transparency of the polygon are then set. If colors or other parameters vary from one portion to another in the polygon, polygons sharing vertices therebetween are created separately as shown in FIG. 8B (920, 946, 947, 948, 951, 949) and are later overlaid for display.

SUMMARY OF THE INVENTION

The conventional technique outlined above involves addressing a large number of overlaid vertices (930–945, 941–943, 931–938, 936, 950, 929). Careful work is required to get the vertices in complete agreement. In the case of a global movement or rotation of such polygons, all overlaid vertices must be moved or rotated in unison. The trouble in animation is that these vertices tend to deviate from one another during such transition.

It is therefore an object of the present invention to provide a method for creating a polygon having divisions formed inside without duplicate setting of overlaid vertices spanning such divisions.

In carrying out the invention and according to one aspect thereof, there is provided a method whereby a base polygon A is first created conventionally. The inside of the base polygon A is divided into a plurality of regions by first selecting one vertex of the base polygon A. A polyline is drawn continuously starting from the selected vertex inside the base polygon A with new vertices set thereon. As the end point of the polyline, another vertex of the base polygon A is selected. When the base polygon is divided by the polyline, the two divided regions are stored.

Other objects,. features and advantages of the invention will become more apparent upon a reading of the following description and appended drawings.

BRIEF DESCRIPTION OF THE DRAWINGS

FIG. 1 is a schematic view of typical screen displays effected on a display by hierarchical shape editing and drawing software embodying the invention;

FIGS. 5A through 5F are schematic views outlining the workings of a drawing routine of the embodiment;

FIGS. 6A and 6B are schematic views outlining the workings of a dividing polyline drawing routine of the embodiment;

FIGS. 8A, 8B and 8C are schematic views illustrating a conventional shape editing technique.

DETAILED DESCRIPTION OF THE PREFERRED EMBODIMENTS

Figure 2:
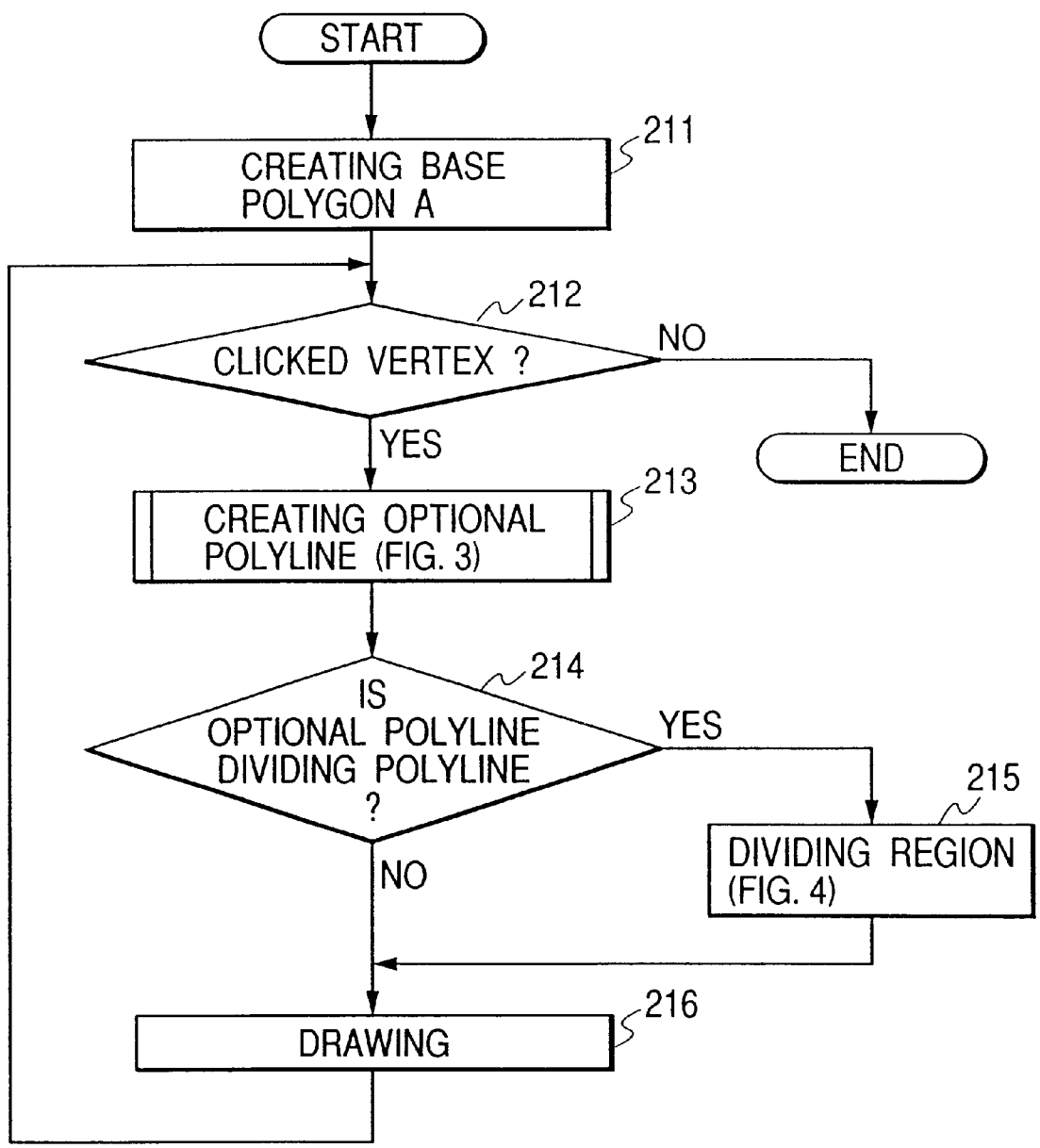
FIG. 2 is a flowchart of processes performed by the embodiment.

One preferred embodiment of this invention will now be described with reference to the accompanying drawings.

[1] System Configuration

FIG. 1 outlines some of the workings of a hierarchical polygon editing and drawing system embodying the invention. Screens 131-1 through 131-4 in FIG. 1 show typical screen displays that appear on a display of the system. A memory 151 connected to a CPU 152 of the system retains hierarchical polygon editing and drawing software 501 to which the hierarchical shape editing and drawing method of the invention is applied. A data table 550 in the software 501 accommodates data to be used thereby. The hierarchical polygon editing and drawing software 501 performs its processing by activating routines 510 through 540 which are described below.

The hierarchical polygon editing and drawing software 501 with its routines 510, 520, 530 and 540 may be loaded from outside the computer into the memory 151 either by means of a storage medium such as CD-ROM, or through a communication network or the like.

A base polygon creating routine 510 is first started to create a base polygon A. The created base polygon A is displayed on a display 131 (screen 131-1).

An optional polyline creating routine 520 is then started to create an optional polyline extending from a vertex of the base polygon A, and the result is displayed on the display 131 (screen 131-2). The optional polyline is judged to be either a dividing polyline or a branching polyline depending on its end point being on one of the existing vertices or not. The judgment is made by the routine 520 in step 333 shown in FIG. 3. If the end point of the optional polyline is interposed between existing vertices, a new vertex is established in that position.

If the optional polyline is judged to be a dividing polyline, a region dividing routine 530 is started in order to divide the base polygon into two regions. The color, transparency, and texture mapping information are set for each of the regions before the divided regions are displayed on the display 131 (screen 131-3).

If the optional polyline is judged to be a branching polyline, the width, color, and other drawing information are set for the polyline. The resulting branching polyline is displayed on the display 131 (screen 131-4).

A drawing routine 540 is then started to draw on the display 131 hierarchical shapes including the base polygon, divided regions and optional polyline.

The rendered image thus output is sent to another image processing system 154 as needed before being printed on paper by a printer 156 or input to a VTR 157 whereby video software is created. Another processing system refers specifically to a system that utilizes computer graphics software, two-dimensional image processing software, word processing software and other resources for image processing purposes.

The optional polyline creating routine 520, region dividing routine 530 and drawing routine 540 will be described later in more detail.

[2] Process Flow

A process flow 200 of the embodiment will now be described with reference to FIG. 2. The hierarchical polygon editing and drawing software 501 in the memory 151 is started first.

In step 211, the hierarchical polygon editing and drawing software 501 is started so that a base polygon A is created by clicking a pointing device on one vertex after another. The coordinates of the vertices are stored into a vertex coordinate table in a data table 550, to be described later.

In step 212, a check is made to see if one of the already established vertices is selected. If one such vertex is found to be selected, then steps 213 through 216 below are reached for further processing. Otherwise step 211 is reached again for the creation of a new base polygon.

In step 213, the optional polyline creating routine 520 is started to create an optional polyline extending from one of the vertices of the base polygon A. The optional polyline is judged to be either a dividing polyline or a branching polyline depending on where the end point of the polyline is positioned.

In step 214, a check is made to see if the optional polyline is a dividing polyline. If the optional polyline is judged to be a dividing polyline, step 215 is reached.

In step 215, the dividing polyline divides the base polygon or a previously created region into two regions. The resulting two regions are stored into a region table in the data table.

In step 216, the drawing routine 540 is started to draw on the display 131 hierarchical shapes including the base polygon, regions and optional polyline.

[3] Optional Polyline Creating Routine

Figure 3:
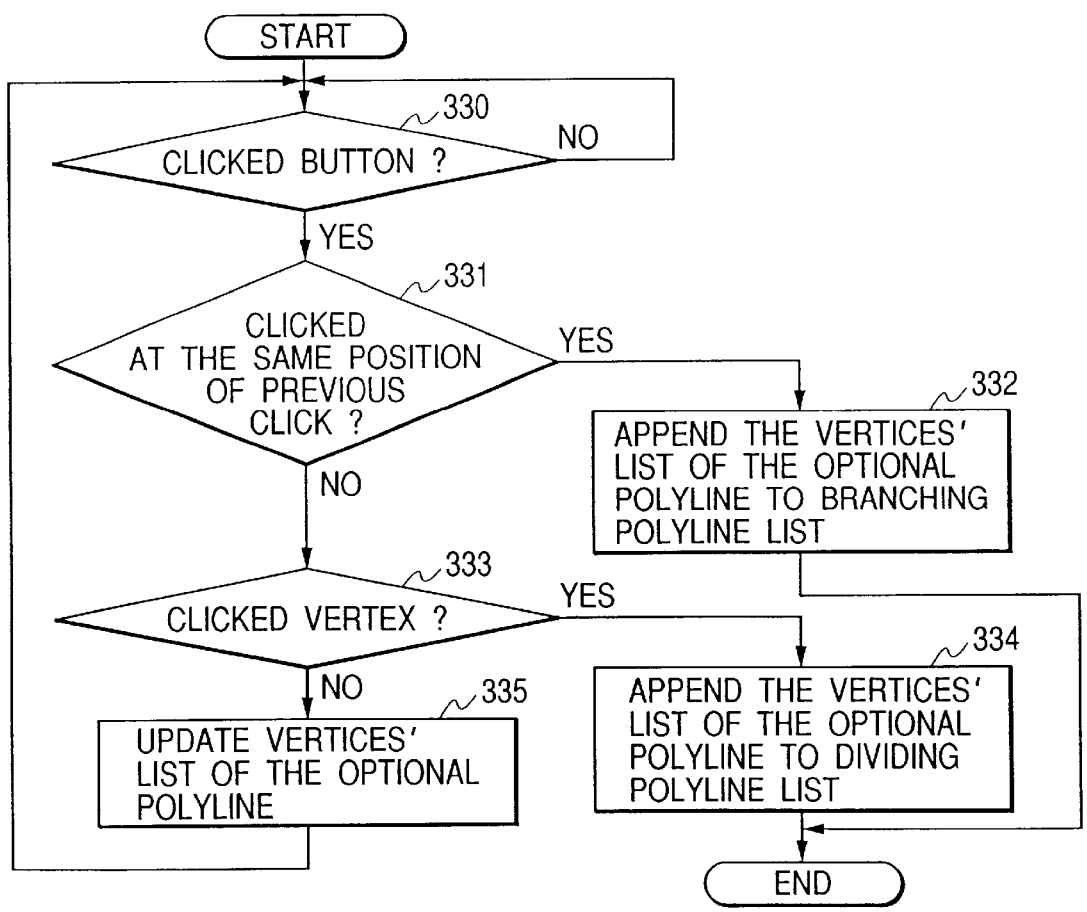
FIG. 3 is a flowchart of steps constituting an optional polyline creating routine of the embodiment.

The optional polyline creating routine 520 will now be described with reference to FIG. 3. FIG. 3 is a flowchart of steps constituting the optional polyline creating routine 520.

In step 330, the routine waits for the button of the pointing device to be clicked on.

In step 331, a check is made upon a click of the pointing device to see if the clicked position is the same as the previously clicked cursor position. If the clicked position is judged to be the same as the previously clicked cursor position, step 332 is reached.

In step 332, data about the vertex in question in an optional polyline list is appended to a vertex table in the data table 550, the vertex number of the vertex in question is appended to a branching polyline list in the data table 550, and the processing is terminated.

In step 333, a check is made to see if the clicked position coincides with a previously established vertex. If the click position is judged to be on such an existing vertex, step 334 is reached.

In step 334, data about the vertex in question in the optional polyline list is appended to the vertex table in the data table 550, the vertex number of the vertex in question is appended to a dividing polyline list in the data table 550, and the processing is terminated.

In step 335, the cursor position of the pointing device is appended to the optional polyline list. Then step 330 is reached again.

[4] Region Dividing Routine

Figure 4:
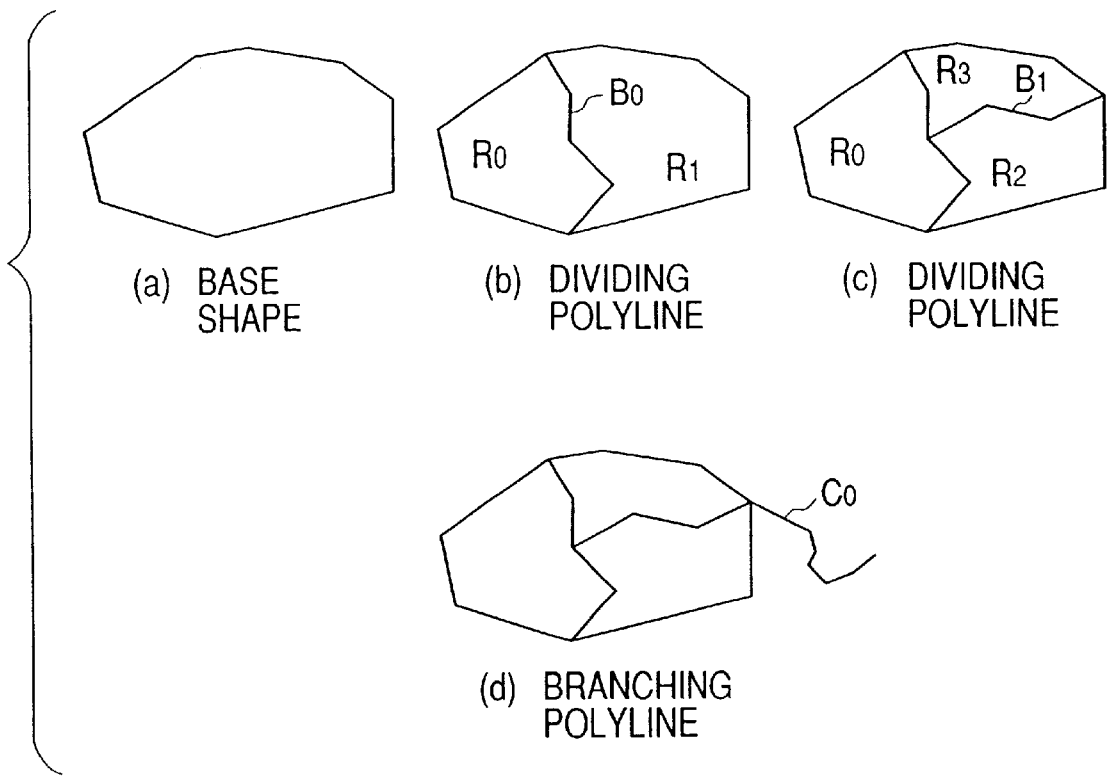
FIGS. 4A through 4D are schematic views outlining the workings of a region dividing routine of the embodiment.

The region dividing routine 530 will now be described with reference to FIGS. 4A through 4D. FIGS. 4A through 4D illustrate a base polygon A as it is created by the base polygon creating routine 510. The base polygon A is divided by a dividing polyline created by the optional polyline creating routine 520. FIG. 4B depicts the base polygon A as it is typically divided into regions R0 and R1 by a dividing polyline B0. If the optional polyline creating routine 520 is used to create a dividing polyline across a previously created region, that region is bisected and the initial region is deleted from the data table 550. FIG. 4C shows the region R1 as it is divided into regions R2 and R3 by a dividing polyline B1. If the optional polyline turns out to be a branching polyline as shown in FIG. 4D, the initial region remains undivided.

[5] Drawing Routine

The drawing routine 540 will now be described with reference to FIGS. 5A through 5F. FIG. 5A is a flowchart of steps constituting the drawing routine 540.

In step 401, the inside of a base polygon is drawn (FIG. 5B).

In step 402, the inside of each of the regions making up the base polygon is drawn (FIG. 5C).

In step 403, a branching polyline is drawn (FIG. 5D).

In step 404, a dividing polyline is drawn (FIG. 5E).

In step 405, a frame of the base polygon is drawn (FIG. 5F).

The inside of a shape is painted isochromatically in a predetermined rendering color. For semitransparent rendering, a rendering color may be added to the most recently drawn image. If a texture mapping image is designated, a texture image is translated into coordinates of the shape in question for mapping.

A frame or a polyline is drawn in accordance with predetermined parameters such as a rendering color and a width. A dividing polyline, instead of being drawn as a solid line, may be drawn as a blurred border between regions as shown in FIG. 6B after the regions involved are painted as depicted in FIG. 6A. The blurred effect is accomplished by rendering a weighted average of colors near the dividing polyline.

[6] Data Table

The data table 550 will now be described with reference to FIG. 7. The data table 550 comprises vertex coordinate sets, a region list made up of regions, and a polyline list composed of polylines. These table components are used to express different colors inside polygons as well as polylines extending from polygon vertices that are not overlaid on one another.

Figures 6, 7:
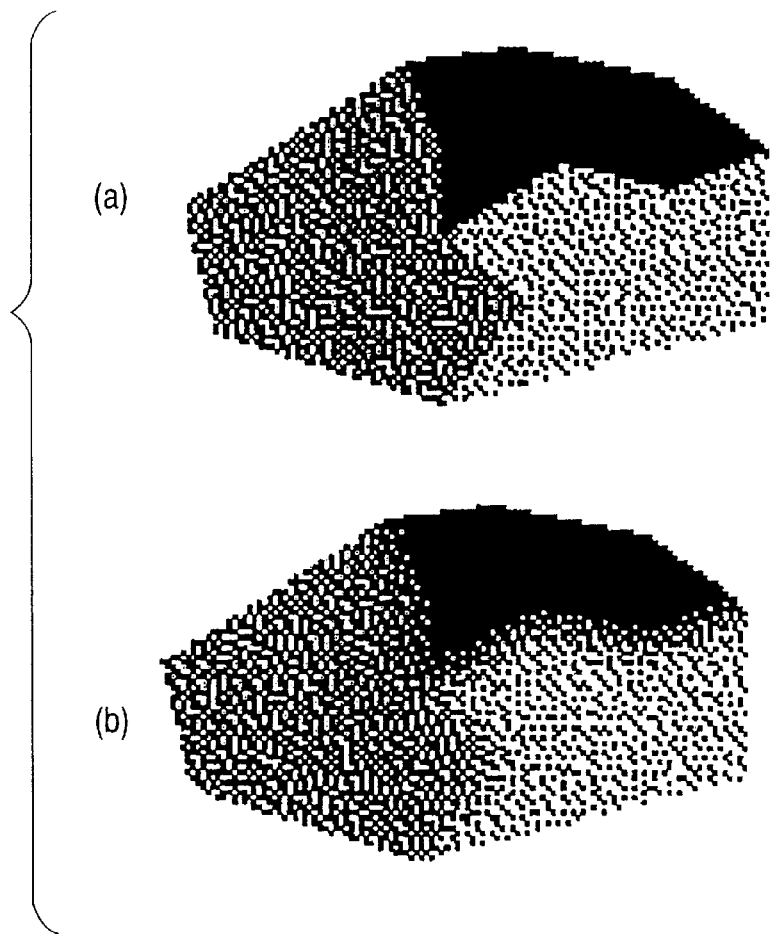
FIG. 7 is a schematic tabular view depicting a data table of the embodiment.

In the table of FIG. 7, fields 601 through 604 constitute a table containing vertex data. The field 601 is filled with vertex coordinates, the field 602 with vertex colors, the field 603 with vertex transparencies, and the field 604 with polyline widths.

A field 605 in FIG. 7 constitutes a table containing data about base polygons. The field 605 accommodates vertex numbers arranged serially.

Fields 606 and 607 in FIG. 7 make up a table containing data about optional polylines. The field 606 is filled with sets of vertex number columns of dividing polylines, and the field 607 with sets of vertex number columns of branching lines.

A field 608 in FIG. 7 constitutes a table containing data about regions. The field 608 is filled with sets of vertex number columns of regions.

According to the invention, as described, a base polygon is first created followed by polylines that divide the interior of the polygon into regions. This allows shapes dividing the interior of the polygon to be easily created without the conventional duplicate setting of overlaid vertices.

As many apparently different embodiments of this invention may be made without departing from the spirit and scope thereof, it is to be understood that the invention is not limited to the specific embodiments thereof except as defined in the appended claims.

What is claimed is:

1. An animation creating method comprising the steps of:

connecting a plurality of vertices by polylines to create a polygon A on a computer so as to store shape information about said polygon A into a data table;

creating a polyline sequence B which either starts from or ends at one of said vertices of said polygon A;

if the starting point of said polyline A coincides with a first vertex of said polygon A and if the end point of said polyline sequence B coincides with a second vertex of said polygon A, then dividing said polygon A by said polyline sequence B into polygons A1 and A2 while deleting the shape information about said polygon A from said data table and storing shape information about said polygons A1 and A2 into said data table; and displaying the resulting polygons on a display on the basis of the stored shape information.

2. An animation creating method according to claim 1, further comprising the step of, if either said starting point or said end point of said polyline sequence B is located on said polylines constituting said polygon A and if the point in question does not coincide with any vertex of said polygon A, then establishing a new vertex at said point.

3. An animation creating method according to claim 1, further comprising the steps of:

determining an order in which to draw shape regions of said polygons A1 and A2 based on the shape information about said polygons A1 and A2; and displaying said polygons A1 and A2 on said display in accordance with the determined order.

4. An animation creating method comprising the steps of:

connecting a plurality of vertices by polylines to create a polygon A on a computer so as to store shape information about said polygon A into a data table;

creating a polyline sequence B which either starts from or ends at one of said vertices of said polygon A;

if the end point of said polyline sequence B is located on said polylines constituting said polygon A, then judging said polyline sequence B to be a dividing polyline;

if the end point of an optional polyline extending from any one vertex of said polygon A is not located on said polylines constituting said polygon A, then judging said optional polyline to be a branching polyline;

if said polyline sequence B is judged to be a dividing polyline, then dividing said polygon A by said polyline sequence B into polygons A1 and A2 while deleting the shape information about said polygon A from said data table, storing shape information about said polygons A1 and A2 into said data table, and displaying on a display the resulting polygons based on the shape information about frames and inner regions constituting said polygons A1 and A2; and if said optional polyline is judged to be a branching polyline, then displaying said branching polyline on said display on the basis of shape information about said branching polyline.

5. An animation creating method according to claim 4, further comprising the step of, if either said starting point or said end point of said polyline sequence B is located on said polylines constituting said polygon A and if the point in question does not coincide with any vertex of said polygon A, then establishing a new vertex at said point.

6. An animation creating method according to claim 4, further comprising the steps of:

determining an order in which to draw shape regions of said polygons A1 and A2 based on the shape information about said polygons A1 and A2; and displaying said polygons A1 and A2 on said display in accordance with the determined order.

7. An animation creating method according to claim 4, further comprising the step of creating blurred boundaries by averaging attributes such as colors and transparencies around said polylines constituting said polygon A.

8. A computer readable medium for storing a computer program to be supplied to a computer which has a display, storing means for storing polygons to be displayed on said display, and controlling means for displaying the polygons on said display, said computer program comprising the steps of:

connecting a plurality of vertices by polylines to create a polygon A on said computer so as to store shape information about said polygon A into a data table;

creating a polyline sequence B which either starts from or ends at one of said vertices of said polygon A;

if the starting point of said polyline A coincides with a first vertex of said polygon A and if the end point of said polyline sequence B coincides with a second vertex of said polygon A, then dividing said polygon A by said polyline sequence B into polygons A1 and A2 while deleting the shape information about said polygon A from said data table and storing shape information about said polygons A1 and A2 into said data table; and displaying the resulting polygons on said display on the basis of the stored shape information.

9. A computer readable medium according to claim 8, wherein said computer program further comprises the step of, if either said starting point or said end point of said polyline sequence B is located on said polylines constituting said polygon A and if the point in question does not coincide with any vertex of said polygon A, then establishing a new vertex at said point.

10. A computer readable medium according to claim 8, wherein said computer program further comprises the steps of:

determining an order in which to draw shape regions of said polygons A1 and A2 based on the shape information about said polygons A1 and A2; and displaying said polygons A1 and A2 on said display in accordance with the determined order.

11. A computer readable medium for storing a computer program to be supplied to a computer which has a display, storing means for storing polygons to be displayed on said display, and controlling means for displaying the polygons on said display, said computer program comprising the steps of:

connecting a plurality of vertices by polylines to create a polygon A on said computer so as to store shape information about said polygon A into a data table;

creating a polyline sequence B which either starts from or ends at one of said vertices of said polygon A;

if the end point of said polyline sequence B is located on said polylines constituting said polygon A, then judging said polyline sequence B to be a dividing polyline;

if the end point of an optional polyline extending from any one vertex of said polygon A is not located on said polylines constituting said polygon A, then judging said optional polyline to be a branching polyline;

if said polyline sequence B is judged to be a dividing polyline, then dividing said polygon A by said polyline sequence B into polygons A1 and A2 while deleting the shape information about said polygon A from said data table, storing shape information about said polygons A1 and A2 into said data table, and displaying on said display the resulting polygons based on the shape information about frames and inner regions constituting said polygons A1 and A2; and if said optional polyline is judged to be a branching polyline, then displaying said branching polyline on said display on the basis of shape information about said branching polyline.

12. A computer readable medium according to claim 11, wherein said computer program further comprises the step of, if either said starting point or said end point of said polyline sequence B is located on said polylines constituting said polygon A and if the point in question does not coincide with any vertex of said polygon A, then establishing a new vertex at said point.

13. A computer readable medium according to claim 11, wherein said computer program further comprises the steps of:

determining an order in which to draw shape regions of said polygons A1 and A2 based on the shape information about said polygons A1 and A2; and displaying said polygons A1 and A2 on said display in accordance with the determined order.

14. A computer readable medium according to claim 11, wherein said computer program further comprises the step of creating blurred boundaries by averaging attributes such as colors and transparencies around said polylines constituting said polygon A.

* * * * *